(12) United States Patent
Chen

(10) Patent No.: US 7,178,811 B2
(45) Date of Patent: Feb. 20, 2007

(54) CHUCK CAPABLE OF DRAWING IN AND PUSHING OUT COLLET

(75) Inventor: Simon Chen, Taichung Hsien (TW)

(73) Assignee: Shin-Yain Industrial Co., Ltd. (TW)

( * ) Notice: Subject to any disclaimer, the term of this patent is extended or adjusted under 35 U.S.C. 154(b) by 447 days.

(21) Appl. No.: 10/419,968

(22) Filed: Apr. 22, 2003

(65) Prior Publication Data

US 2004/0212158 A1  Oct. 28, 2004

(51) Int. Cl.
*B23B 31/20* (2006.01)

(52) U.S. Cl. .......................................... 279/52; 279/51

(58) Field of Classification Search .................. 279/51, 279/52, 53, 48, 58
See application file for complete search history.

(56) References Cited

U.S. PATENT DOCUMENTS

| | | | | |
|---|---|---|---|---|
| 1,114,653 A | * | 10/1914 | Starin | 279/52 |
| 1,680,631 A | * | 8/1928 | Palaith | 279/58 |
| 3,802,713 A | * | 4/1974 | Levy | 279/50 |
| 4,218,165 A | * | 8/1980 | Riddersholm | 409/225 |
| 5,213,015 A | * | 5/1993 | Disston, Jr. | 81/90.9 |
| 5,622,373 A | * | 4/1997 | Tagami | 279/52 |
| 6,270,086 B1 | * | 8/2001 | Lloyd | 279/51 |

* cited by examiner

*Primary Examiner*—Monica Carter
*Assistant Examiner*—Ali Abdelwahed
(74) *Attorney, Agent, or Firm*—Bacon & Thomas PLLC

(57) ABSTRACT

A chuck is composed of a collet sleeve, a sliding member, at least one linkage member, a collet, and a driving member. The collet sleeve includes an axial hole running therethrough and at least one opening in communication with the axial hole. The sliding member is slidably received in the axial hole of the collet sleeve. The linkage member is inserted through the opening of the collet sleeve and connected to the sliding member. The collet is inserted into the axial hole of the collet sleeve and connected to the sliding member. The driving member drives the linkage member and the sliding member to move for drawing in and pushing out the collet with respect to the collet sleeve.

5 Claims, 5 Drawing Sheets

CHUCK CAPABLE OF DRAWING IN AND PUSHING OUT COLLET

BACKGROUND OF THE INVENTION

1. Field of the Invention

The present invention relates generally to a chuck for holding a bar stock, and more particularly to a chuck, which is capable of drawing in and pushing out a collet.

2. Description of the Related Art

When an operator wants to replace a drill of a drill machine, a chuck has to be disassembled from a spindle of the machine first. Then disassembling a collet out of the chuck by a tool to replace the drill. FIG. 1 shows a conventional chuck, which includes a collet sleeve 1, a collet 2, and a draw bar 3. The collet sleeve 1 has an axial hole therein for slidably receiving the collet 2. The draw bar 3 is engaged with a screw hole 2a of the collet 2 for drawing the collet 2 in the axial hole 1a of the collet sleeve 1. When replacing the drill (not shown), the operator must screw out the draw bar 3 by a hexagonal wrench 4 first, and then hammer the chuck by a hammering tool (not shown) to depart the collet 2 from the axial hole 1a of the collet sleeve 1 to replace the drill. However, the aforementioned replacing procedure is too complicated to be easy and efficient.

SUMMARY OF THE INVENTION

The primary objective of the invention is to provide a chuck, which can draw in and push out a collet easily and rapidly.

The foregoing objective of the present invention is attained by the chuck, which is composed of a collet sleeve, a sliding member, at least one linkage member, a collet, and a driving member. The collet sleeve includes an axial hole running therethrough and at least one opening in communication with the axial hole. The sliding member is slidably received in the axial hole of the collet sleeve. The linkage member is inserted through the opening of the collet sleeve and connected to the sliding member. The collet is inserted into the axial hole of the collet sleeve and connected to the sliding member. The driving member drives the linkage member and the sliding member to move for drawing in and pushing out the collet with respect to the collet sleeve.

BRIEF DESCRIPTION OF THE DRAWINGS

FIG. 2 is a semi-sectional view of a preferred embodiment of the present invention, showing that a collet is drawn in.

FIG. 5 is a semi-sectional view of the second preferred embodiment of the present invention, showing that the collet is drawn in.

DETAIL DESCRIPTION OF THE INVENTION

Figure 1:
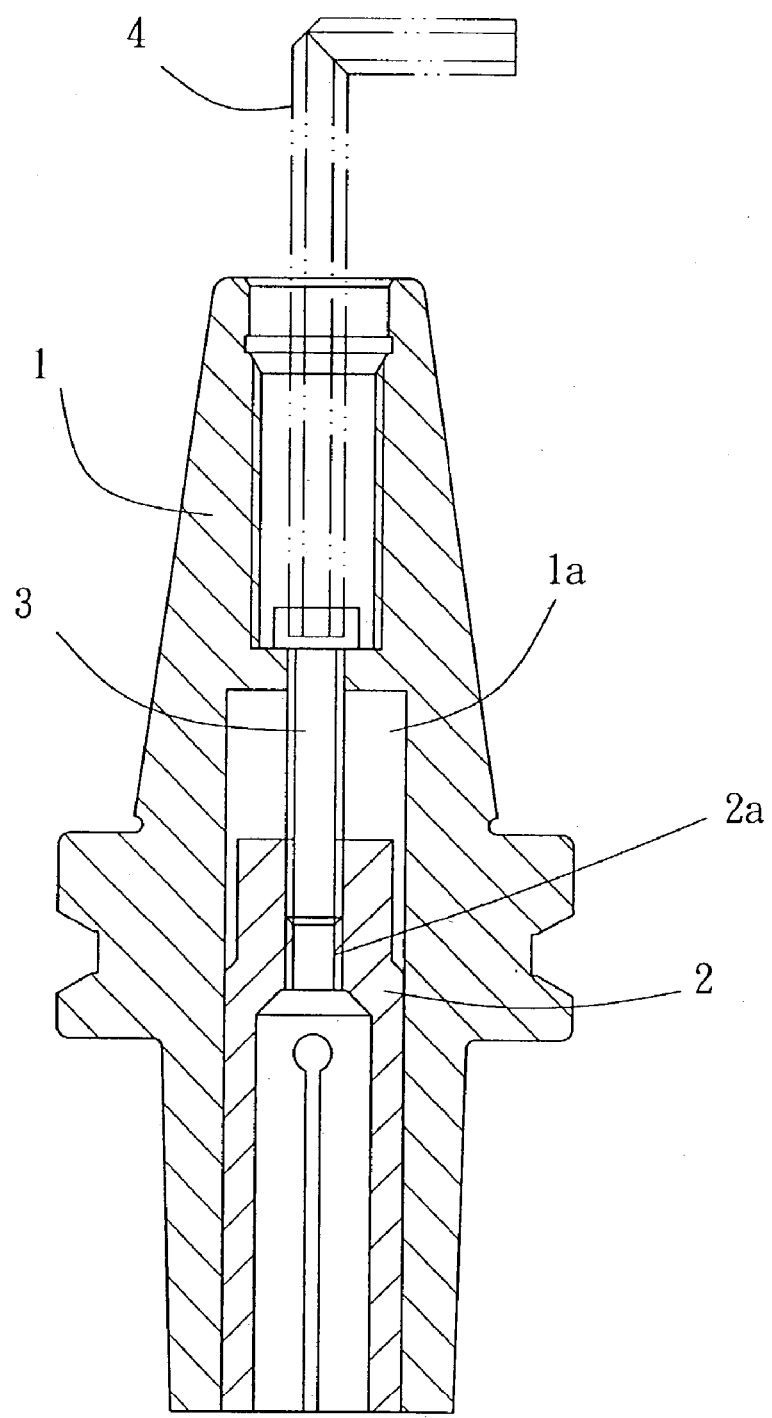
FIG. 1 is a sectional view of a conventional chuck.
Figure 2:
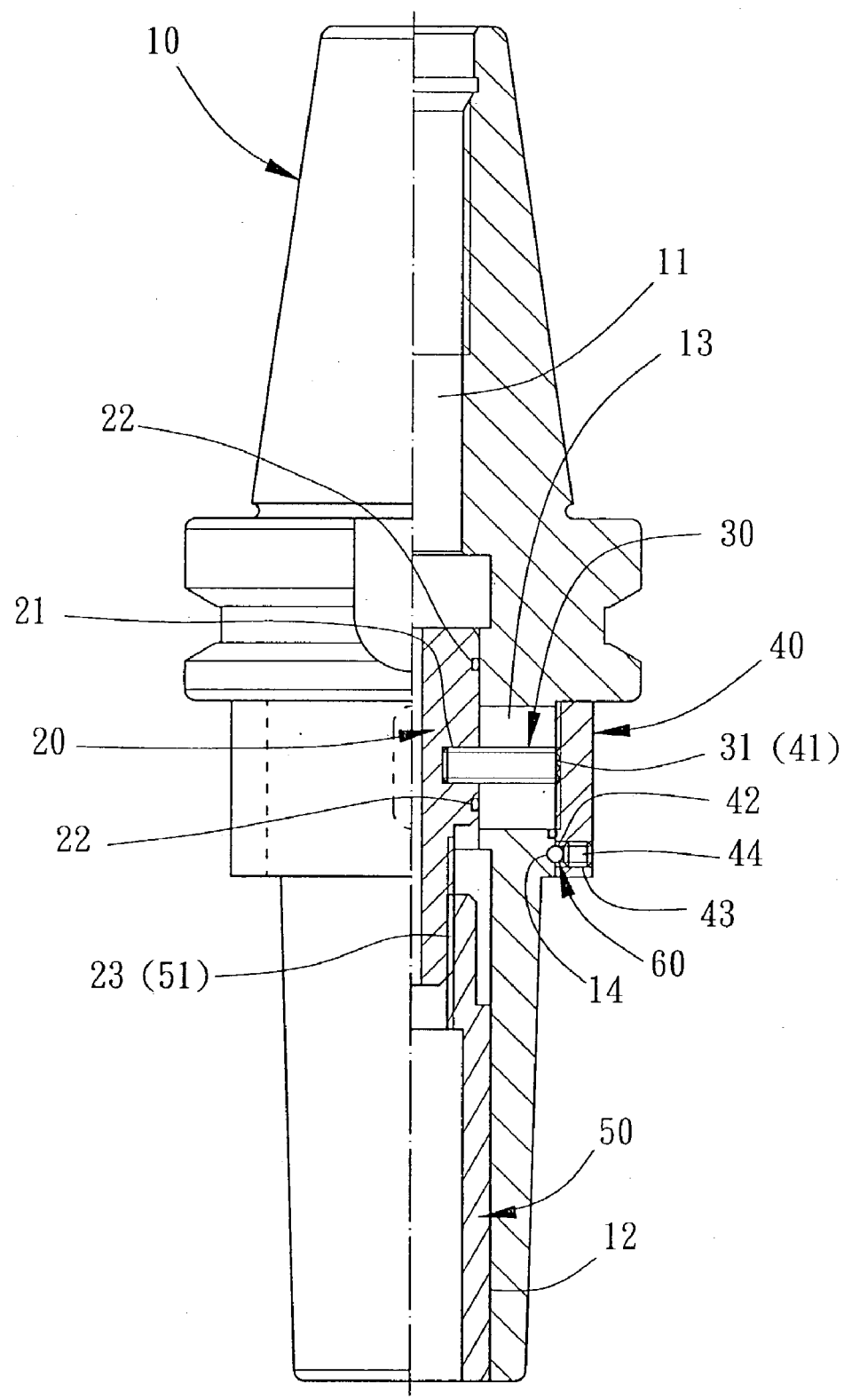

Referring to FIG. 2, a chuck constructed according to a first preferred embodiment of the present invention is composed of a collet sleeve 10, a sliding member 20, four linkage members 30, a driving member 40, and a collet 50.

The collet sleeve 10 includes an axial hole 11 running therethrough, a taper-shaped engaging hole 12 at a lower section of the axial hole 11 for stably receiving the collet 50, four elongated openings 13 at the midsection thereof equidistantly disposed around the collet sleeve 10 and communicating with the axial hole 11, and a concave and arched first annular groove 14 positioned at an outer side thereof and under the elongated openings 13.

The sliding member 20 embodied as a circular column is received in the midsection of the axial hole 11 of the collet sleeve 10 for slidably traversing along the axial hole 11. The sliding member 20 includes four screw holes 21 disposed equidistantly at an outer periphery thereof, and two O-rings 22 fitted onto the outer periphery thereof and engaged against a periphery of the axial hole 11. The sliding member 20 further has a screw segment 23 at a distal section thereof for connected with a screw hole 51 positioned at an upper section of the collet 50, such that the collet 50 can slidably move along with the sliding member 20.

The linkage members 30 (only one linkage member 30 shown in FIG. 2) embodied as screw shafts are respectively inserted through the openings 13 of the collet sleeve 10 and are screwed into the screw holes 21 of the sliding member 20 at a distal end thereof so as to be fixedly connected with the sliding member 20. Each of the linkage members 30 has a rack 31 at the other distal end thereon. The sliding member 20 is restricted by the linkage members 30 and the openings 13 of the collet sleeve 10, thereby preventing the sliding member 20 from rotation inside the axial hole 11.

The driving member 40 embodied as an annular sleeve is fitted onto an outer periphery of a midsection of the collet sleeve 10. The driving member 40 includes a thread 41 at an inner periphery thereof for threadedly engaged with the rack 31 of each of the linkage members 30, an arched second annular groove 42 at the inner periphery thereof corresponding to the first annular groove 14 of the collet sleeve 10, and a through hole 43 running through the driving member 40 for communicating the second annular groove 42 with the outside of the driving member 40. A plurality of metal balls 60 are received and filled in a space defined by the second annular groove 42 of the driving member 40 and the first annular groove 14 of the collet sleeve 10, i.e. the metal balls 60 are partially embedded into the through hole 43 and the first annular groove 14. A pin 44 is inserted into the through hole 43 to seal the through hole 43 for preventing the metal balls 60 from escape the through hole 43, such that the driving member 40 can be rotatable merely within the midsection of the collet sleeve 10.

In operating, turn the driving member 40 to drive the linkage members 30 to move upwards. In the mean time, the sliding member 20 and the collet 50 are driven to move upwards (as shown in FIG. 2), and thereby the collet 50 is gradually fixedly received in the axial hole 11.

Figure 3:
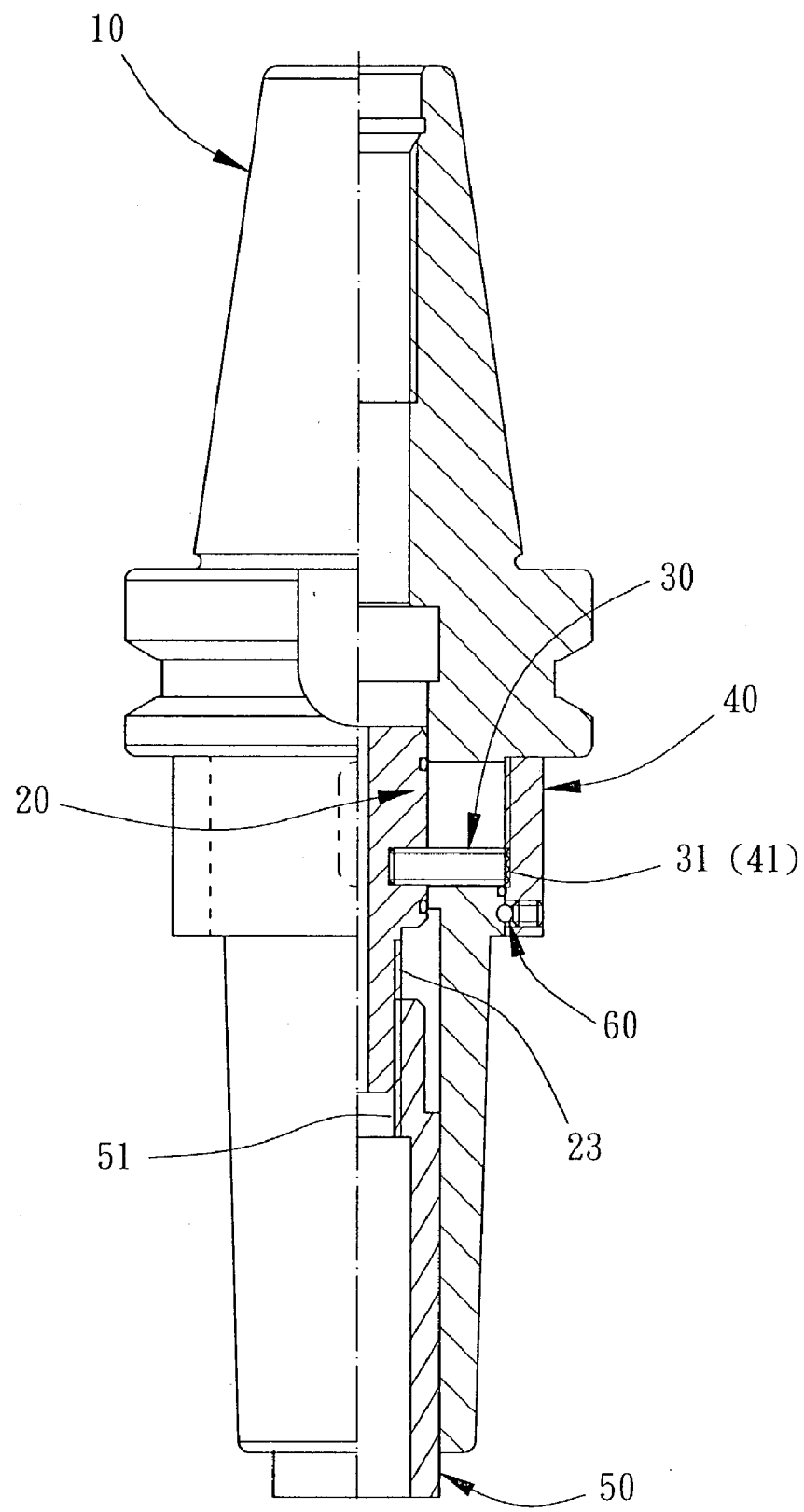
FIG. 3 similar to FIG. 2 shows the collet is pushed out.

On the contrary, turn the driving member 40 in an opposite direction to drive the linkage members 30 and the sliding member 20 to move downwards such that the collet 50 is driven to move downwards. In the mean time, a bottom end of the collet 50 is protruded out of the collet sleeve 10, as shown in FIG. 3. Thus, turn the collet 50 to allow the collet 50 to be detached from the sliding member 20, thereby removing the collet 50 from the chuck.

Figure 4:
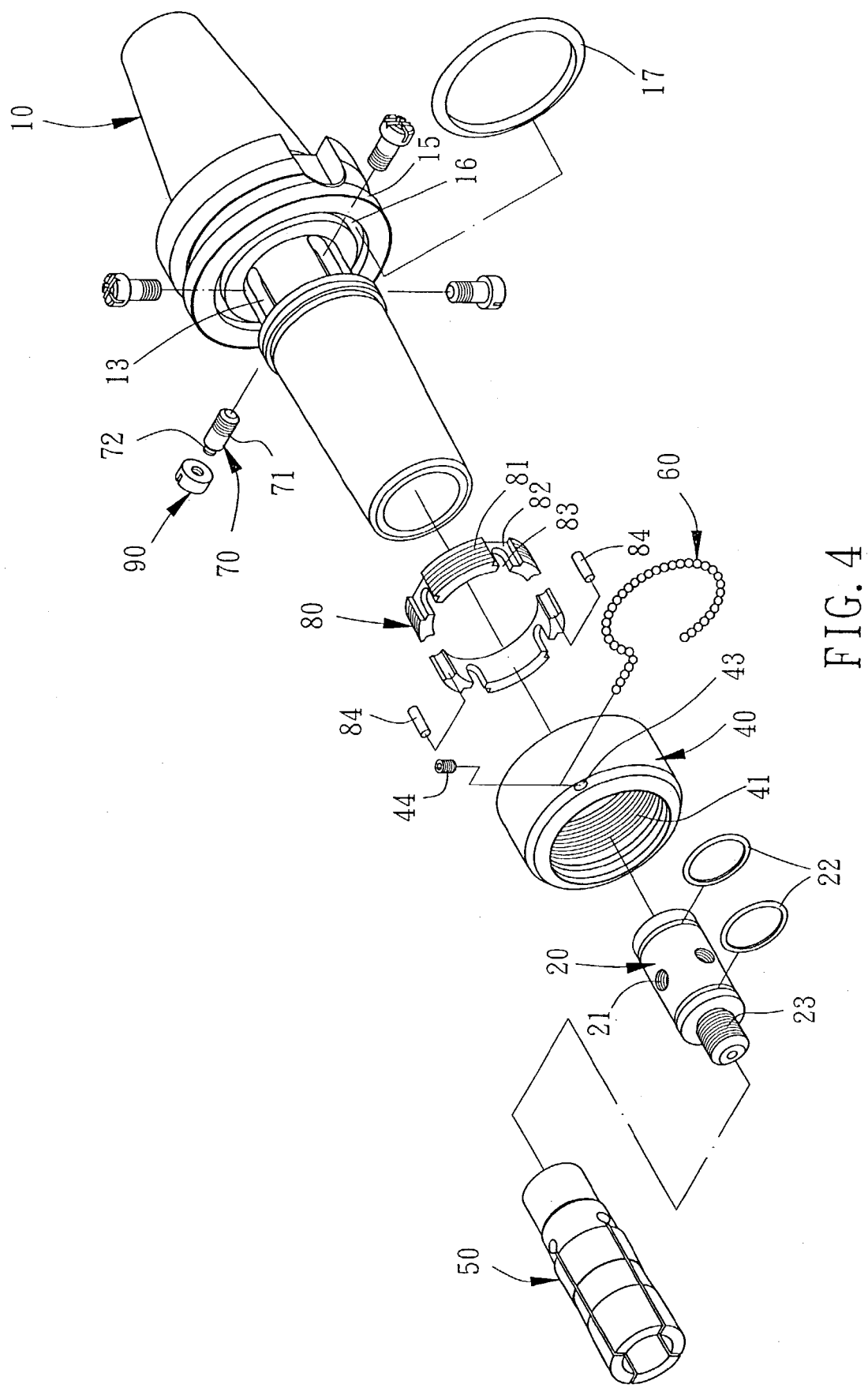
FIG. 4 is an exploded view of a second preferred embodiment of the present invention.
Figure 5:
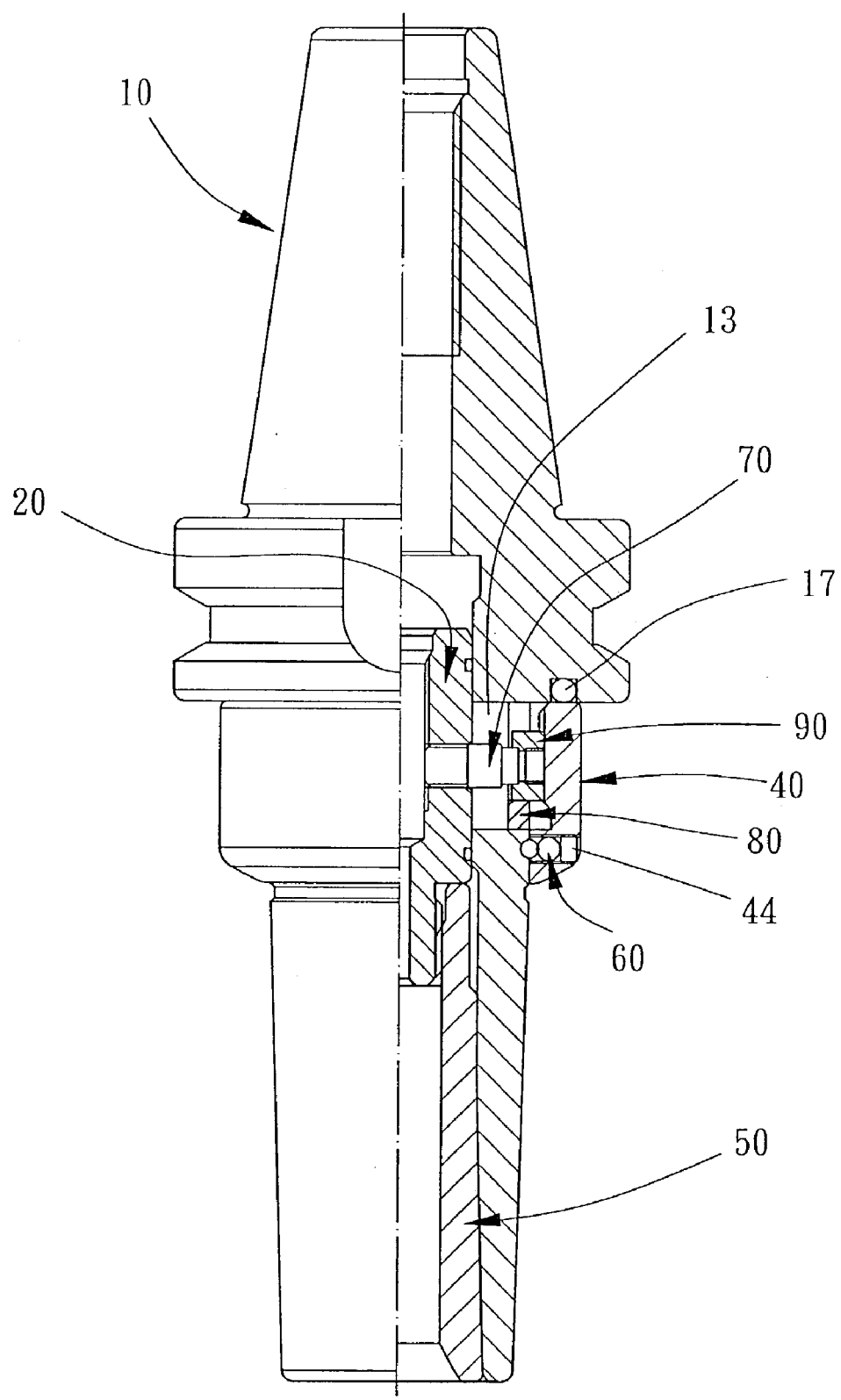

Referring to FIGS. 4–5, a chuck of a second preferred embodiment of the present invention is constructed similarly to the chuck of the first preferred embodiment and composed of the collet sleeve 10, the sliding member 20, the four linkage members 70, the driving member 40, and the collet 50. The difference between the two preferred embodiments lies in that the linkage members 70 includes two threads 71 and 72 respectively positioned at two distal ends thereof, and the collet sleeve 10 further includes an annular portion 15 having an annular recess 16 at a bottom side thereof and a seal ring 17 received in the annular recess 16, and a driven ring 80 fitted onto the midsection of the collet sleeve 10 and having an outer thread 81 at an outer periphery thereof, four concavities 82 formed at the outer periphery thereof, and four slots 83 respectively positioned in the four concavities 82.

Referring to FIG. 4, while assembling, put the sliding member 20 to be received in the axial hole 11, insert the threads 71 of the linkage members 70 respectively through the openings 13 of the collet sleeve 10 to be screwed respectively into the screw holes 21 of the sliding member 20, the driven ring 80 is cut into two semi-annular members that positioned by two steel needles 84 to be mounted around the collet sleeve 10 and covered on the openings 13, and meanwhile, the linkage members 70 are respectively embedded into the slots 83. Then, put a screw nut 90 to be screwed onto the threads 72 of the linkage members 70 and received in each of the concavities 82. Finally, allow the thread 41 of the driving member 40 to be threadedly engaged with the outer thread 81 of the driven ring 80, allow the driving member 40 to contact against the seal ring 17, and put the metal balls 60 into the first and second annular grooves 14 and 42 between the collet sleeve 10 and the driving member 40.

The operation of the second preferred embodiment is similar to the first preferred embodiment but is characterized by that the thread 41 of the driving member 40 is connected with the driven ring 80 to allow the driving member 40 to indirectly and more stably drive the sliding member 20 to traverse while the driving member 40 is rotated.

The advantage of the present invention lies in that it is unnecessary to disassemble the collet sleeve from a tool machine while replacing the drill. It is as easy as turning the driving member to complete the aforementioned replacing procedure, thereby overcoming the drawback of the prior art.

What is claimed is:

1. A chuck comprising:
   collet sleeve having an axial hole running therethrough and at least one opening positioned axially at a midsection of said collet sleeve, said at least one opening in communication with said axial hole;
   a sliding member slidably received in said axial hole of said collet sleeve and having a screw segment at an end thereof;
   at least one linkage member inserted through said opening of said collet sleeve and connected with said sliding member at an end thereof;
   a collet received in said axial hole of said collet sleeve having a screw hole threadedly engaged with said screw segment of said sliding member; and
   a driving member fitted onto said collet sleeve for driving said linkage member and said sliding member to move, allowing said collet to reciprocate with respect to said collet sleeve;
   wherein said linkage member is a shaft provided with an end secured with said sliding member and the other end having a rack; said driving member is an annular sleeve rotatably fitted onto the midsection of said collet sleeve having a thread at an inner periphery thereof for threadedly engaged with said rack of said linkage member; and
   wherein said collet sleeve comprises a first annular groove at an outer periphery thereof; said driving member comprises a second annular groove at an outer periphery thereof for corresponding to said first annular groove of said collet sleeve; said driving member comprises a through hole, a plurality of metal balls inserted into said through hole to be received in said second annular groove of said driving member and said first annular groove of said collet sleeve, and a pin fixedly received in said through hole of said driving member.

2. The chuck as defined in claim 1, wherein said collet sleeve comprises an annular portion and a seal ring, said annular portion having an annular recess at a bottom side thereof, said seal ring being received in said annular recess of said annular portion; said driving member contacts against said seal ring.

3. A chuck comprising:
   a collet sleeve having an axial hole running therethrough and at least one opening positioned axially at a midsection of said collet sleeve, said at least one opening in communication with said axial hole;
   a sliding member slidably received in said axial hole of said collet sleeve and having a screw segment at an end thereof;
   at least one linkage member inserted through said opening of said collet sleeve and connected with said sliding member at an end thereof;
   a collet received in said axial hole of said collet sleeve having a screw hole threadedly engaged with said screw segment of said sliding member;
   a driving member fitted onto said collet sleeve for driving said linkage member and said sliding member to move, allowing said collet to reciprocate with respect to said collet sleeve; and
   a driven ring fitted onto the midsection of said collet sleeve, wherein said driven ring comprises an outer thread at an outer periphery thereof; said at least one linkage member is a shaft having an end fastened with said sliding member and the other end fastened with said driven ring; said driving member is an annular sleeve rotatably fitted onto said outer periphery of said driven ring and has an inner thread threadedly engaged with said outer thread of said driven ring.

4. The chuck as defined in claim 3, wherein said collet sleeve comprises a first annular groove at an outer periphery thereof; said driving member comprises a second annular groove at an outer periphery thereof corresponding to said first annular groove of said collet sleeve; said driving member comprises a through hole, a plurality of metal balls inserted into said through hole to be received in said second annular groove of said driving member and said first annular groove of said collet sleeve, and a pin fixedly received in said through hole of said driving member.

5. The chuck as defined in claim 4, wherein said sliding member comprises at least one screw hole; said driven ring comprises at least one concavity positioned at the outer periphery thereof, said concavity having a slot; said at least one linkage member comprises two threads respectively at two distal ends thereof, one of which is inserted through said slot of said driven ring and said opening of said collet sleeve and is further connected with said at least one screw hole of said sliding member, and the other of which is connected with a screw nut, said screw nut being received in said concavity of said driven ring.

* * * * *